(12) United States Patent
Horie et al.

(10) Patent No.: US 6,685,589 B2
(45) Date of Patent: Feb. 3, 2004

(54) SILENT CHAIN IN WHICH STRENGTH AND ELONGATION OF LINK ROW ARE UNIFORMIZED

(75) Inventors: Hiroshi Horie, Osaka (JP); Toyonaga Saito, Osaka (JP); Toshifumi Sato, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 122 days.

(21) Appl. No.: 10/075,848

(22) Filed: Feb. 13, 2002

(65) Prior Publication Data

US 2002/0111237 A1 Aug. 15, 2002

(30) Foreign Application Priority Data

Feb. 13, 2001 (JP) ...................................... 2001-036090

(51) Int. Cl.[7] .............................................. F16G 13/06
(52) U.S. Cl. ..................................................... 474/212
(58) Field of Search ................................ 474/213, 212, 474/201, 214, 215, 224, 228, 219, 230–234

(56) References Cited

U.S. PATENT DOCUMENTS 4,342,560 A * 8/1982 Ledvina et al. ............. 474/157
5,989,141 A    11/1999 Kozakura et al.

FOREIGN PATENT DOCUMENTS

| EP | 0 926 392 A1 | * | 6/1999 | ........... F16G/13/02 |
| EP | 0 982 515 A1 | * | 3/2000 | ........... F16G/13/04 |
| FR | 658722 A | | 6/1929 | |
| JP | WO 84-01007 A1 | * | 3/1984 | ........... F16G/13/04 |
| JP | 06-33993 A | * | 2/1994 | ................. 474/213 |
| JP | 2001-124149 A | * | 5/2001 | ........... F16G/13/04 |
| JP | 2003-83398 A | * | 3/2003 | ........... F16G/13/06 |
| WO | WO 82-00866 A1 | * | 3/1982 | ................. 474/212 |

* cited by examiner

*Primary Examiner*—Marcus Charles
(74) *Attorney, Agent, or Firm*—Howson and Howson

(57) ABSTRACT

A silent chain is provided with strength and elongation of respective link rows made uniform, elongation of every link made equal regardless of elastic and/or plastic deformation, and inexpensive production cost. The silent chain includes a first link row, a second link row, a connection pin and a pin stopper. Each of the first and second link rows consists of a guide plate and the same number of link plates whose shapes and sizes are the same. The first and second link rows are staggered in the longitudinal direction of the chain, and connected in alternating, interleaved relationship by connection pins. The guide plates and the link plates of the first and second link row are relatively rotatable to the connection pins. The first and second link rows are alternately arranged in mirror image symmetry.

1 Claim, 1 Drawing Sheet

SILENT CHAIN IN WHICH STRENGTH AND ELONGATION OF LINK ROW ARE UNIFORMIZED

BACKGROUND OF THE INVENTION

1. Field of the Invention

The invention relates to a silent chain wound on a pair of sprockets that are apart from each other to transmit power from a drive sprocket to a follower sprocket.

2. Prior Art

A silent chain is a chain wound on a pair of sprockets that are apart from each other to transmit power from a drive sprocket to a follower sprocket. For example, the silent chain disclosed in U.S. Pat. No. 5,989,141 is one in which a link row that consists of a pair of guide plates and a number N of link plates and a link row that consists of a number N+1 of link plates are connected to one another by connection pins and arranged in alternating sequence in an endless loop.

In the silent chain described in the foregoing patent, the link plates in the link row including the guide plates are thin and some of the link plates in the link row that does not include the guide plates are thicker in order to balance the tensile strengths of the link rows.

A first problem is that strength of the link row including the guide plates is different from the strength of the link row that does not include the guide plates.

In the link row which includes guide plates in addition to link plates, the guide plates also bear a part of the load applied to the silent chain. The link row that does not include guide plates bears the load applied to the silent chain only through its link plates. For this reason, it is extremely difficult to make the strengths of the link rows uniform.

A second problem is that a that pitches of the link row including the guide plates and the link row that does not include guide plates easily become different from each other.

If the silent chain does not adopt the invention described in U.S. Pat. No. 5,989,141, but all link plates are the same, the strength of the link row including the guide plates increases, and elongation of the link row including the guide plates becomes smaller compared to elongation of the link row that does not include the guide plates.

Since load balance is taken into consideration in the silent chain that adopts the invention described in the different link rows become closer to a certain extent. However, elongation of the link row is caused by: (1) flexure of pin; (2) load and stress applied to the link plate; (3) load and stress applied to the guide plate; (4) deformation of the guide plate; (5) plastic deformation between pin and pin hole when a proof load is applied; or the like. Therefore, if a configuration of the link row is different, the pitch itself easily becomes different, and the change of pitch is also different when a load is applied.

If the pitch and its change are different in each link row, conditions for engagement with the sprocket are also different in each link row. When the conditions for engagement are different in each link row, problems such as engagement failure and noise occur. Such problems cause adverse effect to the life of entire silent chain.

A third problem is that two or more kinds of link plates must be controlled and assembled correctly.

The length, the height and the thickness of a small link plate are approximately 12 mm, approximately 7 mm and approximately 1 mm respectively. The thickness difference between link plates which have different thickness is approximately 0.4 mm. It is extremely difficult to recognize the thickness difference by visual inspection at the site of mass production. Accordingly, although accurate parts control is used to prevent mixture of different link plates, parts control is not easy. Further, since different link plates are assembled in a link, assembly is laborious and quite uneconomical.

SUMMARY OF THE INVENTION

An object of the invention is to provide a silent chain in which configurations of link rows are made uniform to make the strengths of the link rows equal.

Another object of the invention is to provide a silent chain in which elongation of the links is made equal regardless of elastic deformation and/or plastic deformation.

Still another object of the invention is to provide a silent chain in which the number of parts is reduced to reduce a production cost.

The invention has solved the foregoing problems by a silent chain that includes:

a first link row that consists of one guide plate and a number N of link plates;

a second link row that consists of one guide plate and a number N of link plates; and a connection pin, and in which the guide plates of the first link row and the second link row are of the same shape and size, the link plates of the first link row and the second link row are of the same shape and size, the first link row and the second link row are arranged in staggered arrangement along the longitudinal direction of the chain and connected in alternating, interleaving relationship on the connection pin, and the guide plates and the link plates of the first link row and the second link row are relatively rotatable on the connection pin.

In the silent chain of the invention composed as described above, a guide plate at one side of a first link row spans the outermost link plates of the two adjacent second link rows, and no guide plate is provided at the other side of the first link row. Conversely, a guide plate at one side of a second link row spans the outermost link plates of the two adjacent first link rows, and no guide plate is provided at the other side of the second link row. Therefore, there is only one guide plate for each link row, and the guide plates are in a staggered arrangement along the longitudinal direction of chain.

The configuration of each link row is the same. Specifically, each link row consists of a guide plate and a number of link plates, the guide plates are of the same shape and size, the link plates are of the same shape and size, and the number of link plates in each link row is the same as the number of link plates in every other link row. The guide plate and the link plates of each link row are rotatable on each connection pin.

Accordingly, since the load applied to each link row is the same, the load and the stress applied to the guide plate of the first link row and the guide plate of the second link row are the same. Further, the load and the stress applied to the link plate closest to the guide plate of the first link row and the link plate closest to the guide plate of the second link row are the same. Moreover, the first and second link rows have the same load and stress applied to the other link plates. Because the link rows are composed as described above, the first and second link rows have the same strength.

As in the foregoing, since the load and the stress applied to each guide plate are the same, and the load and the stress applied to each link plate are the same, the elongation of the guide plates and the link plates is also the same regardless of elastic deformation and/or the plastic deformation. The same elongation in the first and second rows causes the pitch to remain the same for each link row, even if the pitch changes.

In other words, the strength and the elongation of each link row are made uniform in the silent chain of the invention. Accordingly, all the link rows are engaged with the sprocket under the same conditions.

PREFERRED EMBODIMENTS OF THE INVENTION

Figure 1:
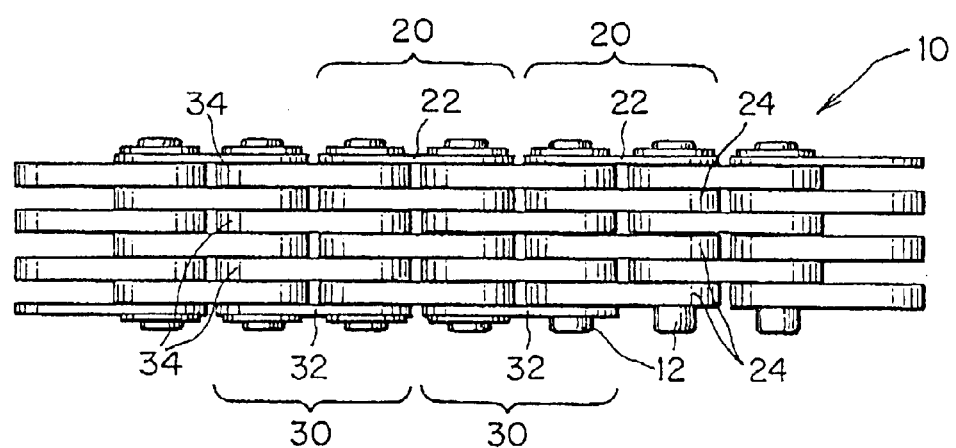
FIG. 1 is a plan view showing a portion of an embodiment of a silent chain according to the invention.
Figure 2:
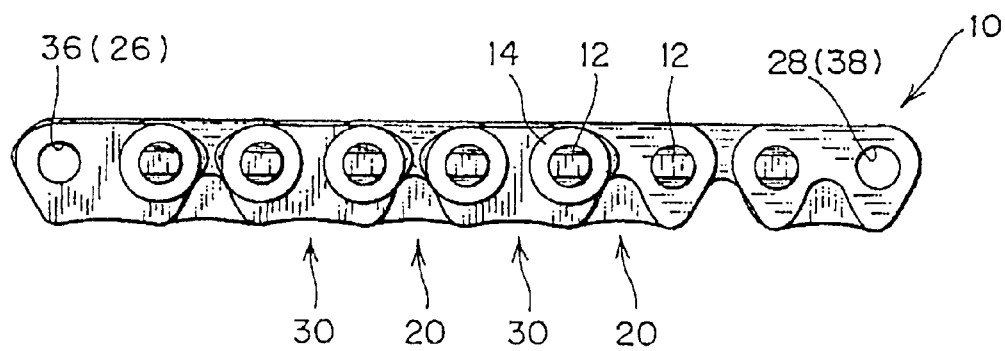
FIG. 2 is a front elevational view of the chain portion of FIG. 1.

An embodiment of the silent chain according to the invention will be described with reference to the drawings. Typical uses of a silent chain are in an engine for automobile, in a transmission for an automobile and in a transfer for an automobile. In such uses, the silent chain is wound in an endless loop around a pair of sprockets that are spaced apart from each other, and transmits power from a drive sprocket to a follower sprocket.

The silent chain 10 basically includes: first link rows 20; second link rows 30; connection pins 12; and pin stoppers 14.

Each first link row 20 consists of a guide plate 22 and three link plates 24. Each link plate 24 has the same shape and size. Each second link row 30 consists of a guide plate 32 and three link plates 34. Each link plate 34 has the same shape and size.

The guide plates 22 of the first link row 20 and the guide plates 32 of the second link row 30 have the same shape and size, and the link plates 24 of the first link row 20 and the link plates 34 of the second link row 30 also have the same shape and size.

In the silent chain 10 of this embodiment, the first link row 20 and the second link row 30 are arranged in a staggered configuration. The guide plates (22, 32) are positioned on outermost sides of the chain, the first link row 20 and the second link row 30 are configured like the teeth of a comb, the connection pin 12, which is cylindrical in shape, is inserted into common pin holes, and the silent chain 10 is thus formed.

With this configuration, the strength and the elongation of the link rows (20, 30) are made uniform. Each of the link rows (20, 30) has the same configuration of guide plate and link plates. Since the load applied to each link row is the same, the same load and stress is applied to the guide plate and link plates of each link row. Accordingly, differences in the strength and elongation of the link rows are eliminated.

From the viewpoint of making the strength and elongation of the link rows uniform, it is preferable to make the relation between the guide plate (22, 32) and the link plates (24, 34) of each link row (20, 30) and the connection pin 12 equal. In this embodiment, each of guide plates (22, 32) includes a pair (front and rear) of pin holes (26, 36). The inner diameter of the pin holes (26, 36) is larger than the outer diameter of the connection pin 12. Further, each of the link plates (24, 34) also includes a pair of (front and rear) pin holes (28, 38). The inner diameter of the pin holes (28, 38) is larger than the outer diameter of the connection pin 12.

Accordingly, the guide plate (22, 32) and the link plates (24, 34) of each link row (20, 30) are relatively rotatable on the connection pin 12. When the connection pin 12 is fitted into the guide plate and the link plates of one link row, sliding movement occurs between the guide plate and the link plates of another link row and the connection pin 12. The guide plate and the link plates of any link row (20, 30) are composed so as to be rotatable by sliding movement on the connection pin 12, and thus the relation between the first link row 20 and the connection pin 12 and the relation between the second link row 30 and the connection pin 12 can be made equal. Accordingly, although elongation of a link row can occur as a result of abrasion or the like, elongation of only one link row does not occur. Even if elongation occurs, the first link row 20 and the second link row 30 have the same elongation.

Further, the guide plate (22, 32) and the link plates (24, 34) of each link row (20, 30) freely rotate and slide on the cylindrical connection pin 12, abrasion of the connection pin 12 is dispersed over the entire periphery of the pin, and does not occur in a particular region. Accordingly, the silent chain 10 of this embodiment has improved elongation endurance.

Because the guide plate (22, 32) and the link plates (24, 34) of any link row (20, 30) are made rotatable by sliding movement on the connection pin 12, it is necessary that the connection pin 12 be held within a predetermined region. In this embodiment, fastening means, such as fitting, snap-fit or riveting, fastens ring-shaped pin stoppers 14 at both ends of the connection pin 12 on the outside faces of the the guide plates (22, 32).

As described, in the silent chain according to the invention, the number and shape of the guide plates and the link plates are the same for each link row, and the guide plates and the link plates of each link row are relatively rotatable on the connection pin. The strength and the elongation of each link row are uniform when the link row is composed in this manner.

Conventionally, although there has existed a problem that a link row that does not include a guide plate is easily fractured, endurance improves when link rows without a difference in strength and elongation are adopted, and their useful life is lengthened.

Since the strength of the link row is made uniform, and the link rows thus do not differ in strength and elongation, the pitch and change of pitch in each link row are also made uniform. Before a proof load is applied immediately after manufacturing the silent chain, the pitch is usually of the same dimension for all link rows. Even if the proof load is applied immediately after manufacture, and even if a tensile load is further applied to the chain during use, the plastic deformation due to the proof load and the elastic deformation due to the tensile load during use are the same for each link row, since the configuration of the link rows is substantially the same. The uniformity of the pitch, and the uniformity of the change of pitch in each link row, makes engagement conditions with the sprocket equal for each link row, and therefore the useful life of the chain is also extended for this reason.

In the invention, only one kind of link plate is required to form the silent chain in which the strength and the elongation are made uniform. Accordingly, the number of parts, the number of part control steps, and the number of assembly steps are reduced, and the process of manufacture of the silent chain is made more economical.

Further, since the use of two or more kinds of link plates having differing thicknesses that cannot be recognized visually, the risk of defects due to the mixing of parts is also minimized.

What is claimed is:

1. A silent chain comprising:

a plurality of first link rows, each of the first link rows consisting essentially of one guide plate and a number N of link plates;

a plurality of second link rows, each of the second link rows consisting essentially of one guide plate and the same number N of link plates; and a plurality of connection pins;

wherein the guide plates of the first link rows and the second link rows are the fit same shape and size, the link plates of the first link rows and the second link rows are of the same shape and size, wherein said first link rows and said second link rows are connected in alternating, interleaving relationship along a longitudinal direction of the chain by said connection pins whereby the guide plates of successive interleaving link rows are in staggered relationship along said longitudinal direction of the chain, each said connection sin extending through the link plates and guide plates of two successive interleaving link rows, wherein the link plates and guide plates through which each said connection pin extends consist of the link plates and one guide plate of each of two successive interleaving link rows, and wherein the guide plates and the link plates of said each pair of successive interleaving first and second link rows are relatively rotatable on the connection pin extending through them.

* * * * *